United States Patent [19]

Taeger

[11] Patent Number: 5,045,878

[45] Date of Patent: Sep. 3, 1991

[54] CROPPING DEVICE

[76] Inventor: Bernd Taeger, 537 King Street East, Hamilton, Ontario, Canada, L8N 1E3

[21] Appl. No.: 535,166

[22] Filed: Jun. 8, 1990

[30] Foreign Application Priority Data

Jul. 28, 1989 [CA] Canada .................................. 606889

[51] Int. Cl.$^5$ ............................................. G03B 27/58
[52] U.S. Cl. .......................................... 355/74; 355/72
[58] Field of Search .................................... 355/72, 74

[56] References Cited

U.S. PATENT DOCUMENTS

| | | | |
|---|---|---|---|
| 1,486,196 | 3/1924 | Ruffner | 355/74 |
| 2,166,878 | 7/1939 | Rodriguez | 355/74 |
| 3,779,643 | 12/1973 | Nosco et al. | 355/74 |

FOREIGN PATENT DOCUMENTS

| | | | |
|---|---|---|---|
| 2701809 | 7/1978 | Fed. Rep. of Germany | 355/74 |
| 603253 | 6/1948 | United Kingdom | 355/74 |

*Primary Examiner*—Monroe H. Hayes
*Attorney, Agent, or Firm*—Michael M. Sakovich

[57] ABSTRACT

An adjustable frame for cropping and formatting copy, photographs and design graphics includes a pair of indicia bearing "L" shaped members held in slidably overlying relation by a pair of retaining clips. Each clip comprises a flat base having a pair of upstanding opposite side walls with free ends that turn inwardly to form two upper channels which slidably engage and guide the edges of an arm of one member. A corresponding pair of depending opposite side walls are positioned orthogonally to the upstanding side walls in the plane of the base and form a pair of lower channels that slidably engage and guide the edges of a crossing arm of the other member.

18 Claims, 2 Drawing Sheets

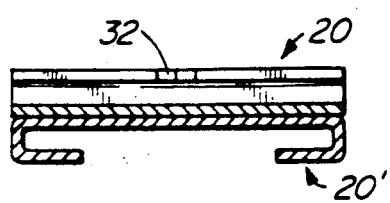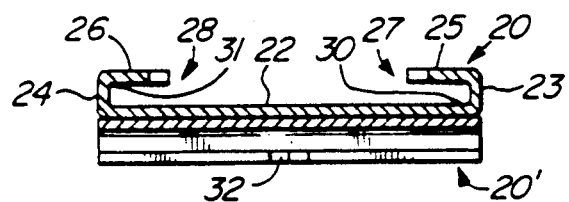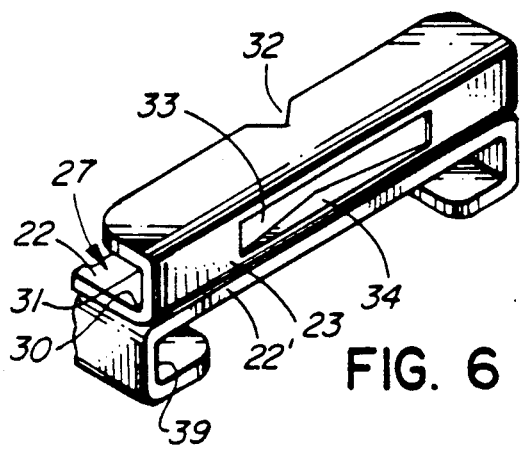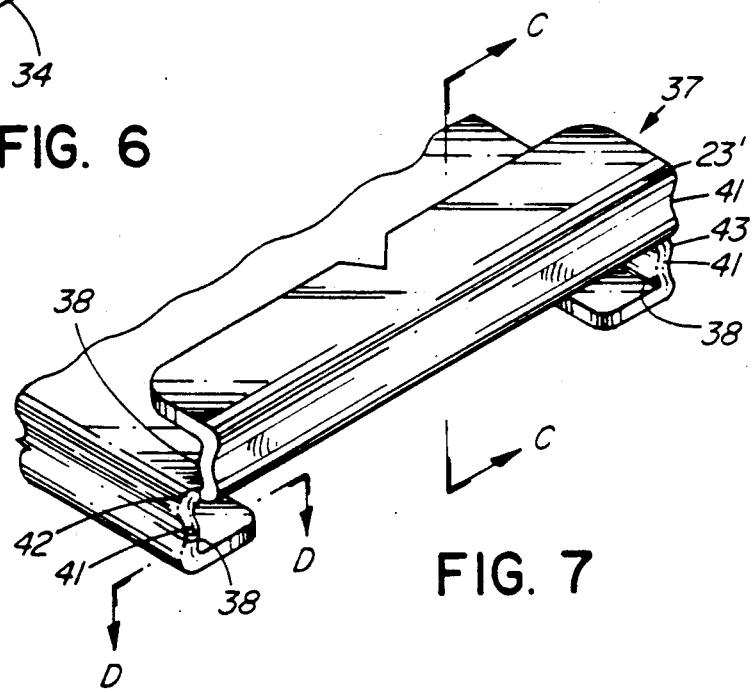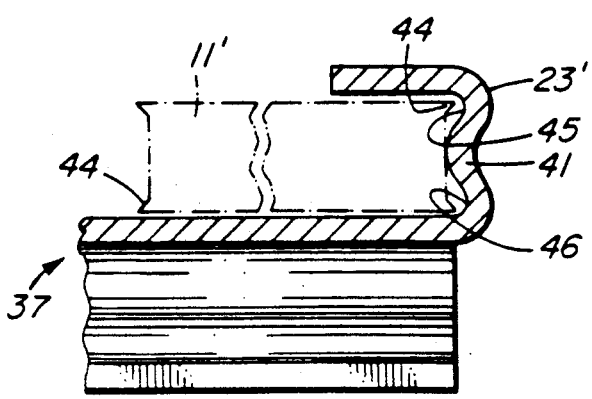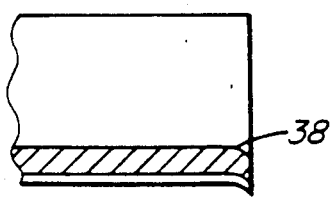

CROPPING DEVICE

FIELD OF THE INVENTION

The present invention relates to a slidably adjustable frame useful in formatting copy, photographic images and design graphics, and more particularly to a clip for retaining separate members of the frame in slidably adjustable relation.

BACKGROUND OF THE INVENTION

An adjustable frame in the form of a cropping device is frequently used in the interrelated fields of advertising, photography and graphic design and is generally used to establish formats. In the case of photography, unwanted images are blocked out by the cropping device in order to arrive at a desired motif; in other words, a desired portion of the entire available image. In advertising that employs graphics artwork, the cropping device may be used beneficially for sizing blocks of advertising space as well as determining an aspect ratio of the artwork from which an enlargement or reduction in size of the artwork may be readily calculated.

Practitioners in the foregoing fields generally resort to a makeshift pair of crossed "L" shaped members, the arms of which are orthogonally positioned in order to obtain adjustments in size when formatting photographs, artwork and the like. As would be expected, the usual problems experienced with this arrangement include difficulty in quickly obtaining croppings of various size with precise 90° angles at intersections where the arms of the two "L" shaped members cross. Furthermore, the individual members are usually detached from each other and often become separated so that they are not at hand when required.

SUMMARY OF THE INVENTION

A principal object of the invention is the provision of a cropping device that comprises a pair of "L" shaped members held together in overlying, laterally displaceable relation.

Another provision of the invention is a cropping device in which corresponding arms of the separate "L" shaped members are held in crossed, mutually slidable relation by means of a clip.

Yet another provision of the invention is indicia displayed along the individual arms of the members which cooperates with an indicator of the clip to provide convenient scaling of copy, photographs and design graphics.

Still another provision of the invention is a cropping device that is simple in construction and thereby conducive of economical manufacture.

The problems associated with the prior art may be substantially overcome and the foregoing provisions achieved by recourse to the invention which is embodied in a cropping device having a pair of movable members disposed in overlying, laterally displaceable relation for circumferentially defining a polygon, and an improved clip for retaining corresponding pairs of arms of the members in crossed, mutually slidable relation. The clip comprises a thin-walled base, a pair of opposing first walls, each wall upstanding from the base wall and including a free end portion inwardly turned to define a pair of opposing channels adapted to slidably engage and guide the edges of the first arm, and a pair of opposing second walls positioned orthogonally to the pair of first walls in the plane of the base wall, each second wall depending from the base wall and including a free end portion inwardly turned to define a pair of opposing channels adapted to slidably engage and guide the edges of a crossed second arm.

BRIEF DESCRIPTION OF THE DRAWINGS

The invention will now be more particularly described with reference to embodiments thereof shown, by way of example, in the accompanying drawings wherein:

FIG. 4 is a cross-sectional view of the clip of FIG. 3 taken along the lines A—A;

FIG. 5 is a cross-sectional view of the clip of FIG. 3 taken along the lines B—B;

FIG. 6 is a partial enlarged view of the clip of FIG. 3 showing a slide tension spring;

FIG. 7 is a partial enlarged view of another embodiment of the clip shown in FIG. 1;

FIG. 8 is a cross-sectional view of the clip of FIG. 7 taken along the lines C—C; and FIG. 9 is a cross-sectional view of the clip of FIG. 7 taken along the lines D—D.

DESCRIPTION OF THE ILLUSTRATED EMBODIMENTS

Figure 1:
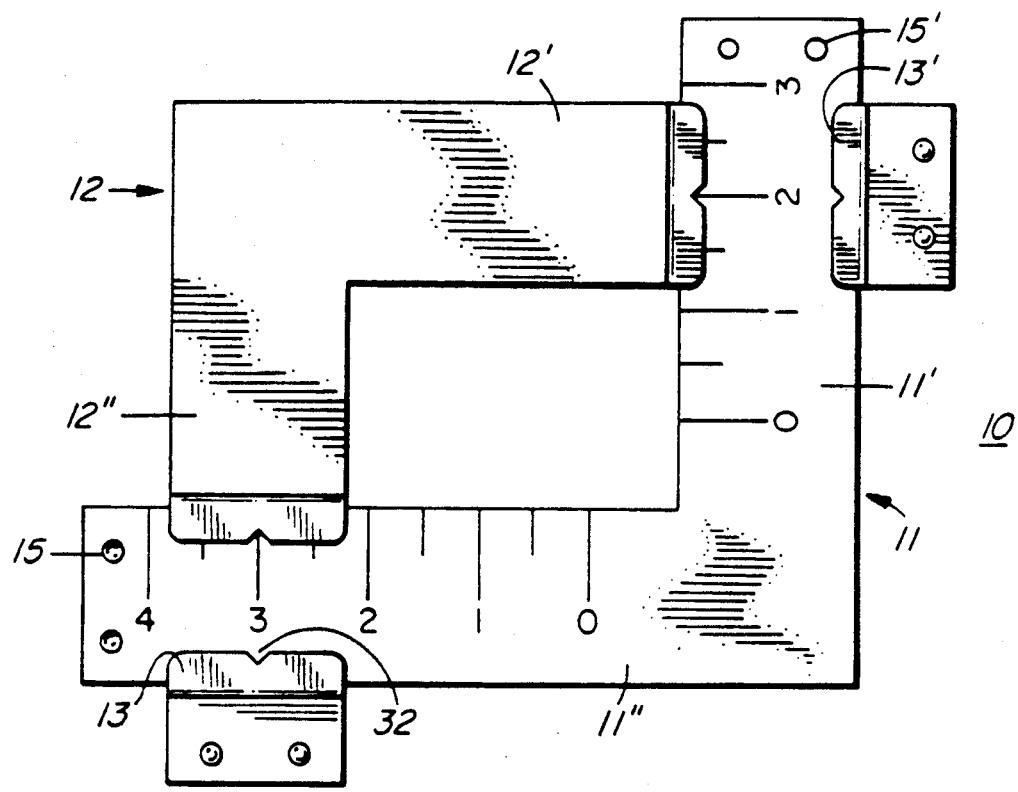
FIG. 1 is a top plan view of one embodiment of a cropping device in accordance with the present invention.

A top plan view of a cropping device 10 is illustrated in FIG. 1. The device 10 comprises a pair of "L" shaped movable members 11 and 12 having arms which are shown overlying one another such that arms 11' and 11" are orthogonal to corresponding arms 12' and 12". It will be understood that this overlying relationship permits a lateral displacement between the members 11 and 12 such that in respective distances between the arms 11' and 12" and the arms 11" and 12' are continuously variable over the permitted limits of movement for the members 11 and 12. The inside corner of each member is a right angle and the relative displacement between the members 11 and 12 results in a circumferentially defined polygon.

Figure 2:
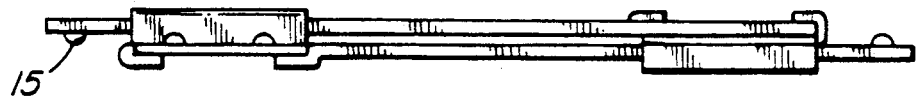
FIG. 2 is an end view of the device of FIG. 1.

Relative movement along orthogonal axes (not shown) in the plane of either member 11 or 12 is provided in a controlled manner by a slidable clip 13 which retains corresponding pairs of arms of the members 11 and 12 in crossed, mutually slidable relation. The distance over which opposite pairs of arms of the members 11, 12 may be separated is determined by the length of the shorter arm of either member. Although the members 11 and 12 are shown to have arms of unequal length, other embodiments may be fashioned to accommodate specific applications by having such arms of equal length. Irrespective of arm lengths, however, lateral displacement of the arm 11' stops when the arm comes into abutting relationship with the clip 13 as will be understood from FIG. 1. Lateral displacement in the opposite direction is arrested when stop means, shown as a pair of protrusions 15, are drawn into contact with the clip 13 as will understood from the views of FIG. 1 and FIG. 2.

Corresponding stops occur for the arms 12' and 11", i.e., when an inside edge of the arm 11" contacts the clip 13' or when a pair of protrusions 15' contact the clip 13' in the same manner as previously described for the clip 13.

Figure 3:
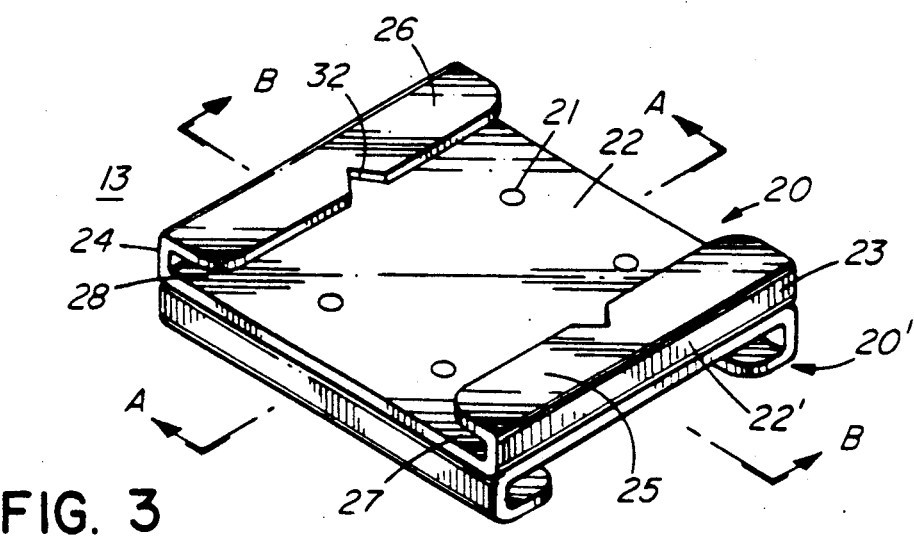
FIG. 3 is a perspective view of a clip shown in FIG. 1.

A larger, more detailed view of the clip 13 is illustrated in a perspective view in FIG. 3. It will be understood therefrom that the clip 13 comprises two sub-clips 20 and 20' which are identical in form and structure but which are positioned orthogonally one to the other in a common plane and joined between thin-walled bases 22 and 22' of the sub-clips.

The clip 13 embodiment is considered to be the preferred form of construction even though it entails an additional step of joining the sub-clips 20 and 20', as by resistance welding at spots 21. Thus, although the clip 13 could be fabricated from a single lamina to functionally parallel the complete assembly of the clip 13 as illustrated in FIG. 3, such an operation would entail additional tooling.

On the other hand, by resorting to sub-clips 20 and 20' as described, simpler tooling may be used which may be amortized over twice the number of piece parts manufactured, thereby substantially reducing the cost of such tooling.

Since the sub-clip 20 is structurally the same as the sub-clip 20', a description of one such sub-clip should suffice for purposes of fully understanding the invention. Accordingly, the description herein to follow will refer to the sub-clip 20 exclusively, it being understood that the same description applies to the sub-clip 20'.

FIGS. 4 and 5 represent separate cross-sectional views of FIG. 3 as shown in order to best illustrate the positional arrangement of the sub-clips 20 and 20'. It will be observed in these figures that the sub-clip 20 comprises the aforedescribed base 22 which further comprises a pair of opposing walls 23 and 24 that are upstanding from the base 22. A free end portion 25, 26 of each wall 23 and 24, respectively, is turned inwardly as illustrated to define a pair of opposing channels 27 and 28 which are adapted to slidably engage and guide the edges of the arms of the members 11 and 12.

One adaptation that will provide a smooth, slidable engagement includes uniform radii 30 and 31 formed at the respective bends of the walls 23, 24 and the base 22, and the portions 25, 26 relative respective walls 23 and 24. In this respect, a smooth slidable engagement between the clip 13 and either member 11 or 12 is enhanced if the edges of the individual arms are deburred, or preferably rounded. This arrangement is advantageously employed when the members 11, 12 are fabricated from metal such as anodized aluminum.

Format adjustment of a photograph is readily acquired using the device 10 because of the ease with which the members 11 and 12 may be moved to develop a polygon of appropriate size to enclose the desired subject matter. Blocked out portions of the photograph are achieved by the arms of the members 11 and 12 which, in the embodiment illustrated, are opaque and serve as a definitive margin. In this regard, the members 11 and 12 are fabricated from 1.524 mm thick, black planished or calendered vinyl which is available in sheet form. The clip 13 is fabricated from 0.25 mm stainless steel which is identified as C 301 stainless steel H/.

The aspect ratio of the polygon defined by the inside edges of the members 11 and 12 is easily determined by measurements taken from appropriate indicia printed or engraved along the innermost and/or outermost edges of at least the member 11 as illustrated in FIG. 1. Each clip 13 includes two indicator notches 32 that permit accurate readings of indicia to be made. In the device 10, the members 11 and 12 have been slidably positioned to show a reading of two units on the arm 11' and three units on the arm 11''. This equates to an aspect ratio of 2:3 for the polygon circumscribed by the inside edges of the members.

Examples of indicia that may be applied to the members 11 and 12 include centimeters on the innermost edges of the member 11 and inches on the outermost edges thereof. Alternatively, or in addition, the member 12 may be marked along its edges to show picas and agates which are terms of measurement used in publishing.

Frictional engagement between the channels 27 and 28 and any one of the aforementioned arms is dependent upon the amount of play between the side walls of the channels and the respective arms. Close observance of tolerances may be employed to achieve an optimum condition whereby the individual arms may slide through the channels readily. Preferably, however, there will be sufficient frictional interference between the channels and the arms so that the clips 13 will hold the positional arrangement of the members 11 and 12 during normal handling.

FIG. 6 is a fragmental view of a portion of the clip 13 illustrated in FIG. 3 and constitutes another embodiment of the invention since it includes slide tension means disposed in the channel 27 for retarding sliding movement between the clip 13 and an arm of the members 11 and 12. This partial view is enlarged to illustrate in greater detail the radii 30 and 31 as well as the tension means which is shown as a punched and formed portion of the wall 23. It will be observed that the punched portion comprises a strip 33 that forms a continuum with the wall 23 at one end of a slot 34. In addition, the strip 33 is bent slightly in a central region thereof such that the apex of the bend faces inwardly and exerts a resistive force against an edge of a member 11 or 12 in contact therewith to retard sliding movement between the clip 13 and the members. Although only a single strip 33 is illustrated in FIG. 6, it will be understood that additional strips 33 may be used in the clip 13. For example, at least one such strip may be formed in at least one of the channels of each sub-clip 20 and 20'.

It will be appreciated from the foregoing description that the respective arms of the members 11 and 12 are disposed in separate, adjacent planes as illustrated. The device 10 need not be confined to this configuration, however, since flexibility of the thin-walled members 11 and 12 permits the individual arms to slidably cross one over the other into the plane of an adjacent arm. Furthermore, the members 11 and 12 need not be fabricated as unitary structures. Instead they may be assembled from individual strips that are crossed and joined by known means at an overlapping end. In this manner, the same "L" configuration is achieved but the individual arms of each member will be disposed in adjacent planes.

A further embodiment of the invention may have seen in a modified form of the slide tension means illustrated in FIG. 6. Whereas the strip 33 has been described as being punched out from the wall 23, this punching operation may be avoided by employing a similar but separately formed strip (not shown) disposed in a known manner within selected ones of the channels 27 and 28. In this way, the strip may be constructed of heavier gauge material to provide an increased resistive force against a sliding arm of one of the members 11 and 12. Alternatively, increased frictional resistance may be obtained by fastening both ends of a similar but lighter gauge strip within its channel. One such means of fastening could be achieved by way of resistance welding.

Another embodiment of the clip 13 is illustrated as a unitary clip 37, differing in that the latter is fabricated from a single lamina of the aforedescribed stainless steel stock. A partial, cross-sectional view is shown in FIG. 7.

A further difference between the clips 13 and 37 will be seen in the provision of a curved lip 38 (FIG. 9) that facilitates sliding movement of the arms of the members 11 and 12. The curved lip feature is particularly important when the members are fabricated from a relatively soft material such as plastic sheet stock. The curvature of the lip 38 permits the edges of the arms of the members to slide freely without catching a sharp edge 39 (FIG. 6) as may occur in the clip 13.

In additional feature of the clip 37 embodiment is illustrated in an enlarged, partial cross-sectional view in FIG. 8. It will be observed here that an inwardly bowed portion 41, of end walls 23', 42 and 43, avoids the need for deburring the corners 44 of the arms which are typified by the arm 11', shown in a phantom end view. Because the edges of the arms are in sliding contact with an inside surface of the bowed portion 41, clearance spaces are formed along inside radii 45 and 46 to accommodate the burred corners 44 as illustrated.

It will be apparent to those skilled in the art, that the aforedescribed embodiments may be varied to meet particular specialized requirements without departing from the true spirit and scope of the invention disclosed. These embodiments are therefore not to be taken as indicative of the limits of the invention but rather as exemplary structures of the invention which is defined by the claims appended hereto.

The embodiments of the invention in which an exclusive property or privilege is claimed are defined as follows:

1. A cropping device for scaling and formatting copy, photographs and design graphics, comprising:
   a pair of movable members disposed in overlying, laterally displaceable relation for circumferentially defining a polygon;
   a first clip for retaining a first pair of the arms in crossed, mutually slidable, spaced relation, comprising:
   a base wall;
   a pair of opposing first side walls upstanding from the base wall to form a broad, open first channel within which a first arm is slidably disposed, each first side wall including a free end portion inwardly turned to define a pair of opposing first narrow channels adapted to slidably engage and guide the edges of the first arm; and
   a pair of opposing second side walls positioned orthogonally to the pair of first side walls in the plane of the base wall, each second side wall depending from the base wall to form a broad, open second channel within which a second arm is slidably disposed and including a free end portion inwardly turned to define a pair of opposing second narrow channels adapted to slidably engage and guide the edges of a crossed second arm, the first pair of crossed arms being spaced apart by the thickness of the base wall; and
   a second clip corresponding to the first clip for retaining a corresponding second pair of arms of the members in crossed, mutually slidable, spaced relation.

2. A cropping device as claimed in claim 1, wherein the movable members are "L" shaped and wherein the arms of each member are coplanar.

3. A cropping device as claimed in claim 2, wherein the walls of the first and second narrow channels are formed with predetermined inside radii to facilitate smooth, slidable engagement with the arms of the members.

4. A cropping device as claimed in claim 3, wherein the "L" shaped members are fabricated from a thin-walled material.

5. A cropping device as claimed in claim 4, further comprising stop means disposed on the members to limit sliding displacement through the clips.

6. A cropping device as claimed in claim 5, wherein the ends of the opposing first and second walls are formed as a curved lip that facilitates sliding movement of the arms.

7. A cropping device as claimed in claim 6, further comprising indicia disposed on the arms.

8. A cropping device as claimed in claim 7, wherein the opposing first and second side walls include an inwardly bowed portion adapted to slidably contact the edges of the arms and to define a clearance space along each inside radius of the opposing channels to accommodate burred corners of the edges of the arms.

9. A cropping device as claimed in claim 8, wherein the inwardly turned free end portions of each clip include a pair of diametrically opposed indicator notches.

10. A cropping device as claimed in claim 9, wherein the base wall comprises:
    a first lamina that includes the first side walls as an integral portion thereof; and
    a second lamina that includes the second side walls as an integral portion thereof, the second lamina being integrally joined with the first lamina.

11. A cropping device as claimed in claim 10, wherein the first and second lamina are joined by resistance welds.

12. A cropping device as claimed in claim 11, wherein the edges of the "L" shaped members are radiused to slidably engage the corresponding radiused inside corners of the first and second narrow channels.

13. A cropping device as claimed in claim 1, wherein the movable members are "L" shaped and wherein the arms of each member are in separate adjacent planes.

14. A cropping device as claimed in claim 13, wherein the arms of each member are mechanically joined to form the "L" shape.

15. A cropping device as claimed in claim 10, wherein the lamina are fabricated from stainless steel sheet of 0.25 mm thickness.

16. A cropping device as claimed in claim 15, wherein the members are fabricated from 1.524 mm thick, black planished or calendered vinyl.

17. A cropping device as claimed in claim 10, further comprising slide tension means disposed in at least one of each pair of opposing channels for retarding the sliding movement of the clip.

18. In a cropping device having a pair of movable members disposed in overlying, laterally displaceable relation for circumferentially defining a polygon, the improvement of a clip for retaining corresponding pairs of arms of the members in crossed, mutually slidable, spaced relation, comprising:
    a base wall;

a pair of opposing first side walls upstanding from the base wall to form a broad, open first channel within which a first arm is slidably disposed, each first side wall including a free end portion inwardly turned to define a pair of opposing first narrow channels adapted to slidably engage and guide the edges of the first arm within the open first channels; and a pair of opposing second side walls positioned orthogonally to the pair of first side walls in the plane of the base wall, each second side wall depending from the base wall to form a broad, open second channel within which a second arm is slidably disposed and including a free end portion inwardly turned to define a pair of opposing second narrow channels adapted to slidably engage and guide the edges of a crossed second arm, the crossed arms being spaced apart by the thickness of the base wall.

* * * * *